United States Patent
Creed

(10) Patent No.: US 11,416,407 B2
(45) Date of Patent: Aug. 16, 2022

(54) METHOD AND APPARATUS FOR CACHE SLOT ALLOCATION BASED ON DATA ORIGINATION LOCATION OR FINAL DATA DESTINATION LOCATION

(71) Applicant: EMC IP HOLDING COMPANY LLC, Hopkinton, MA (US)

(72) Inventor: John Creed, Innishannon (IE)

(73) Assignee: Dell Products, L.P., Hopkinton, MA (US)

( * ) Notice: Subject to any disclaimer, the term of this patent is extended or adjusted under 35 U.S.C. 154(b) by 168 days.

(21) Appl. No.: 16/881,100

(22) Filed: May 22, 2020

(65) Prior Publication Data
US 2021/0365379 A1 Nov. 25, 2021

(51) Int. Cl.
| | |
|---|---|
| *G06F 12/0871* | (2016.01) |
| *G06F 12/0879* | (2016.01) |
| *G06F 9/50* | (2006.01) |
| *G06F 11/34* | (2006.01) |
| *G06F 11/30* | (2006.01) |
| *G06F 12/0868* | (2016.01) |

(52) U.S. Cl.
CPC ......... *G06F 12/0871* (2013.01); *G06F 9/505* (2013.01); *G06F 11/3034* (2013.01); *G06F 11/3409* (2013.01); *G06F 12/0868* (2013.01); *G06F 12/0879* (2013.01)

(58) Field of Classification Search
CPC .. G06F 12/0871; G06F 9/505; G06F 11/3034; G06F 11/3409; G06F 12/0879
See application file for complete search history.

(56) References Cited

U.S. PATENT DOCUMENTS

| | | | |
|---|---|---|---|
| 2011/0320687 A1* | 12/2011 | Belluomini | G06F 12/0804 711/103 |
| 2012/0265934 A1* | 10/2012 | Gupta | G06F 3/0652 711/114 |
| 2013/0132667 A1* | 5/2013 | Benhase | G06F 12/0802 711/113 |
| 2016/0253259 A1* | 9/2016 | Jin | G06F 12/0891 711/122 |
| 2017/0039136 A1* | 2/2017 | Sterns | G06F 12/0804 |
| 2017/0220478 A1* | 8/2017 | Saidi | G06F 12/0875 |
| 2017/0351609 A1* | 12/2017 | Ash | G06F 12/0868 |
| 2018/0165214 A1* | 6/2018 | Farmahini Farahani | G06F 12/0888 |
| 2019/0155736 A1* | 5/2019 | Hagersten | G06F 12/0811 |
| 2021/0216463 A1* | 7/2021 | Chaudhari | G06F 1/30 |

* cited by examiner

*Primary Examiner* — Andrew J Cheong
(74) *Attorney, Agent, or Firm* — Anderson Gorecki LLP

(57) ABSTRACT

Operational information in a storage system is collected regarding storage media storage tiers, devices, drives, tracks on drives, and logical storage layers, to determine an estimated amount of time it will take to write data from cache to the intended drive when a new write operation arrives at the storage system. This information is then used to decide which type of cache is most optimal to store the data for the write operation, based on the estimated amount of time it will take to write data out from the cache. By allocating cache slots from a faster cache to write operations that are expected to quickly be written out to memory, and allocating cache slots from the slower cache to write operations that are expected to take more time to be written out to memory, it is possible to increase the availability of the cache slots in the faster cache.

20 Claims, 6 Drawing Sheets

METHOD AND APPARATUS FOR CACHE SLOT ALLOCATION BASED ON DATA ORIGINATION LOCATION OR FINAL DATA DESTINATION LOCATION

FIELD

This disclosure relates to computing systems and related devices and methods, and, more particularly, to a method and apparatus for cache slot allocation based on data origination location or final data destination location.

SUMMARY

The following Summary and the Abstract set forth at the end of this application are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, operational information in a storage system is collected regarding storage media storage tiers, devices, drives, tracks on drives, and logical storage layers, to determine an estimated amount of time it will take to write data from cache to the intended drive when a new write operation arrives at the storage system. This information is then used to decide which type of cache is most optimal to store the data for the write operation, based on the estimated amount of time it will take to write data out from the cache. By allocating cache slots from a faster cache to write operations that are expected to quickly be written out to memory, and allocating cache slots from the slower cache to write operations that are expected to take more time to be written out to memory, it is possible to increase the availability of the cache slots in the faster cache. A similar process can be used to select cache slots for read operations, based on an amount of time it is expected to take to read data into the cache based on the current storage location of the data, and the estimated amount of time it will take to transmit the data to the host.

DETAILED DESCRIPTION

Aspects of the inventive concepts will be described as being implemented in connection with a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, software, and/or computer instructions that are stored on a non-transitory tangible computer-readable medium and implemented by multi-purpose tangible processors, and any combinations thereof.

Figure 1:
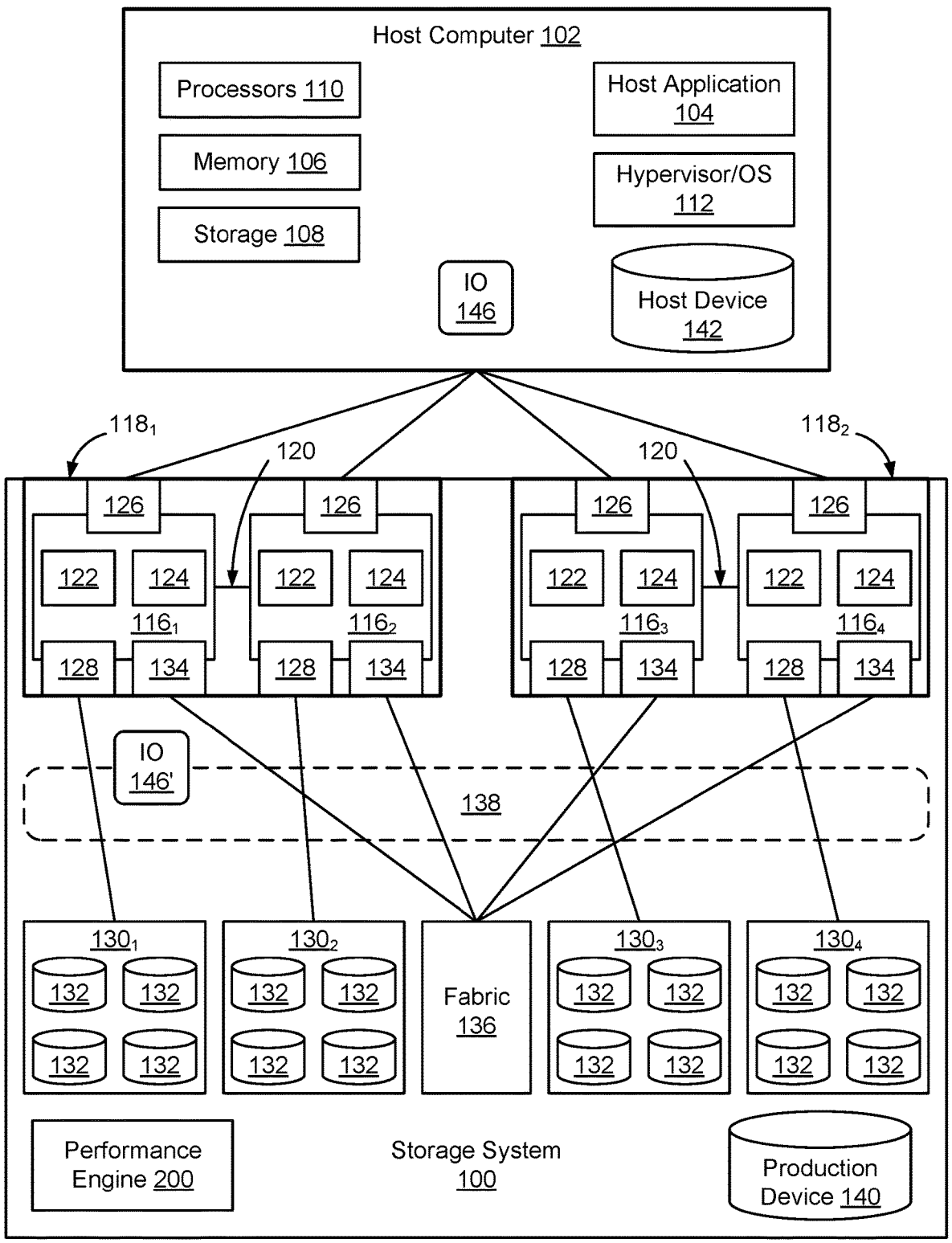
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example the host computer 102 is a server with volatile memory 106, persistent storage 108, one or more tangible processors 110, and a hypervisor or OS (Operating System) 112. The processors 110 may include one or more multi-core processors that include multiple CPUs, GPUs, and combinations thereof. The volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers, and although an external host computer 102 is illustrated, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$)

and ($116_3$-$116_4$), are organized as storage engines $118_1$ and $118_2$, respectively, for purposes of facilitating failover between compute nodes 116. In some embodiments, the paired compute nodes 116 of each storage engine 118 are directly interconnected by communication links 120. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one or multiple storage engines 118.

Each compute node, $116_1$, $116_2$, $116_3$, $116_4$, includes processors 122 and a local volatile memory 124. The processors 122 may include a plurality of multi-core processors of one or more types, e.g. including multiple CPUs, GPUs, and combinations thereof. The local volatile memory 124 may include, for example and without limitation, any type of RAM, and in some embodiments is used to implement a cache for processors 122. In some embodiments, cache 124 is implemented using two or more types of cache technologies, such that there is a difference in performance between different portions of cache 124. For example, in some embodiments cache 124 may be implemented using both DRAM (Dynamic Random Access Memory) and SCM (Storage Class Memory). DRAM cache tends to have higher performance in terms of read/write speed, but is much more expensive. SCM cache, by contrast, has lower performance than DRAM cache in terms of read/write speed, but is less expensive and, hence, it is easier to economically include a larger size SCM cache in a given compute node 116. Another type of cache that may be used in some embodiments is NAND (flash) based storage. NAND tends to be slower than SCM, but is less expensive. Multiple types of cache technologies may be used in storage system 100, as long as there are at least two types of cache that have different performance characteristics in terms of read/write speeds.

Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$ using a PCIe bus, or may be connected to the compute nodes $116_1$-$116_4$, for example, by an IB (InfiniBand) bus or IB fabric switch 136.

In some embodiments, each compute node 116 also includes one or more CAs (Channel Adapters) 134 for communicating with other compute nodes 116 directly or via an interconnecting fabric 136. An example interconnecting fabric 136 may be implemented using InfiniBand.

Each compute node 116 may allocate a portion or partition of its respective local volatile memory 124 to a virtual shared "global" memory 138 that can be accessed by other compute nodes 116, e.g. via DMA (Direct Memory Access) or RDMA (Remote Direct Memory Access) such that each compute node 116 may implement atomic operations on the local volatile memory 124 of itself and on the local volatile memory 124 of each other compute node 116 in the storage system 100.

The storage system 100 maintains data for the host applications 104 running on the host computer 102. For example, host application 104 may write host application data to the storage system 100 and read host application data from the storage system 100 in order to perform various functions. Examples of host applications 104 may include, but are not limited to, file servers, email servers, block servers, and databases.

Logical storage devices are created and presented to the host application 104 for storage of the host application data. For example, a production device 140 and a corresponding host device 142 are created to enable the storage system 100 to provide storage services to the host application 104. The host device 142 is a local (to host computer 102) representation of the production device 140. Multiple host devices 142 associated with different host computers 102 may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by one or more of the compute nodes $116_1$-$116_4$ at non-contiguous addresses in shared global memory 138 and on various different managed drives 132 on storage system 100.

In some embodiments, the storage system 100 maintains metadata that indicates, among various things, mappings between the production device 140 and the locations of extents of host application data in the shared global memory 138 and the managed drives 132. In response to an IO (Input/Output command) 146 from the host application 104 to the host device 142, the hypervisor/OS 112 determines whether the IO 146 can be serviced by accessing the host computer 102 memory 106. If that is not possible then the IO 146 is sent to one of the compute nodes $116_1$-$116_4$ to be serviced by the storage system 100.

In the case where IO 146 is a read command, the storage system 100 uses metadata to locate the commanded data, e.g. in the shared global memory 138 or on managed drives 132. If the commanded data is not in the shared global memory 138, an empty cache slot is selected on one of the local memories 124 of the compute nodes 116. The requested data is temporarily copied into the selected slot of shared global memory 138 from the managed drives 132 and sent to the host application 104 via one of the compute nodes $116_1$-$116_4$. In the case where the IO 146 is a write command, in some embodiments the storage system 100 selects a cache slot in one of the local memories 124 of one of the compute nodes 116. The data is then written into the selected cache slot in shared global memory 138, the data is marked as dirty, and new metadata is created that maps the address of the data on the production device 140 to a location to which the block is written on the managed drives 132. The data is then destaged to the selected drive 132 and the cache slot is freed to be used in connection with another IO operation. The shared global memory 138 may enable the production device 140 to be reachable via all of the compute nodes $116_1$-$116_4$ and paths, although the storage system 100 can be configured to limit use of certain paths to certain production devices 140.

Some storage systems, in connection with processing a write operation, receive the data associated with the write operation and store the data in cache memory prior to writing the data to disk. In any system that handles write data, which is accepted and stored in cache memory prior to saving it to disk, the time it takes to save each partial piece of data IO or track to disk determines the overall workload throughput capability of the storage system 100. According to some embodiments, information regarding the ability, and future predicted ability, to save specific individual pieces of user data to disk is used to organize and manage usage of cache 124. By using faster cache resources for faster cache transactions, it is possible to optimize overall performance of the storage system 100 by optimizing utilization of faster cache resources for an increased number of cache transactions.

In some embodiments, a performance engine 200 collects operational information that is available in the storage system 100 regarding particular storage media storage tiers, devices 140, drives 132, tracks on drives 132, and/or one or more logical storage layers, to determine an estimated amount of time it will take to write data from cache 124 to drive 132 or to read data from drive 132 to cache 124. This information is then used to decide which type of cache is most optimal to store the data for the IO operation, based on the estimated amount of time the cache slot is likely to be used for the IO operation. For example, if it is determined that the data associated with a write operation will be saved to disk quickly, such as in the case of data being saved to an SCM drive or to a Flash drive, then a cache slot in a higher performing (faster) cache technology such as DRAM cache may be selected. By contrast, if it is determined that the data associated with the write operation will be saved to disk slowly, for example due to current system congestion or because the data will be saved to a slower drive such as a low cost Flash drive or magnetic HDD, then a cache slot in a lower performing (slower) cache technology such as an on-board SCM cache may be selected. Similar considerations may be used to select cache slots for read operations when the requested data is not already in cache 124.

By allocating cache slots from the high-cost/high performance cache technology to write operations that are expected to quickly be written out to drives 132, and allocating cache slots from the lower performing cache technology to write operations that are expected to take more time to be written out to drives 132, it is possible to increase the availability of the cache slots in the high-cost/high performance cache technology. Specifically, by assigning write operations that are expected to clear quickly to the higher performing cache, the slots in the higher performing cache will become available more frequently, to thereby increase the number of times each of the cache slots in the higher performing cache is able to be used over time. Likewise, by assigning read operations that are expected to clear quickly to the higher performing cache, the slots in the higher performing cache will become available more frequently thus maximizing use of the higher performing cache.

For example, assume as a hypothetical that fast destage operations take on the order of 1 unit of time for data to be written out to drive 132, and that slow destage operations take on the order of 3 units of time for data to be written out to drive 132. If a set of cache slots are assigned an even mixture of fast and slow operations, the average rate of reuse for a cache slot will be on the order of 2 units of time. However, if the cache slots are only used to implement the fast write operations, the average rate of reuse for a cache slot will be on the order of 1 units of time, which allows the slots of the higher performance cache to be used twice as often. Accordingly, according to some embodiments, write operations that are expected to destage quickly are assigned to the higher performing cache technology and write operations that are expected to destage more slowly are assigned to the lower performing cache technology. By segregating write operations according to how quickly those operations are expected to write out to disk, it is possible to increase the reuse rate of the cache slots implemented using the higher performing cache technology.

In some storage systems, space in cache memory 124 is divided up into units referred to herein as cache slots 220. When a new write operation is accepted into the system for a track or address space, and the data is not already either partially or fully in cache, then cache slot 220, must be allocated to receive this new incoming write data. A cache slot 220 may be of any desired size, depending on the implementation.

Figure 2:
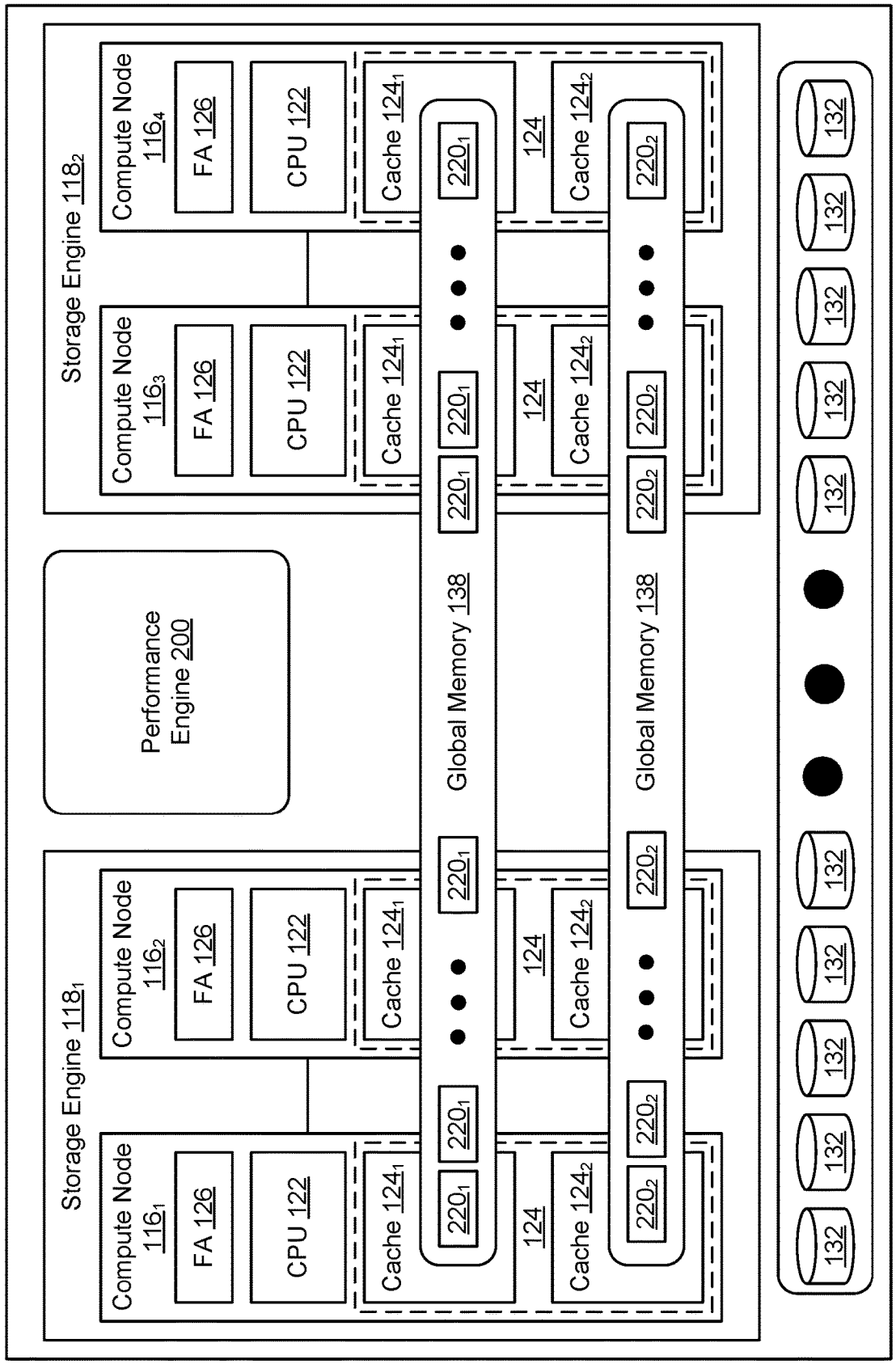
FIG. 2 is a functional block diagram of the example storage system of FIG. 1 in greater detail, according to some embodiments.

FIG. 2 shows an example storage system having two storage engines $118_1$ and $118_2$. The storage system 100 may have a single storage engine 118 or multiple storage engines 118 depending on the embodiment, and the example shown in FIG. 2 includes only two storage engines 118 merely for ease of explanation. As shown in FIG. 2, in some embodiments each storage system 118 has a pair of compute nodes 116, and each compute node has a cache 124 implemented using two separate caches $124_1$, $124_2$ with different operational characteristics. For example, cache $124_1$ may be implemented using DRAM and cache $124_2$ may be implemented using SCM. Other cache technologies may be used as well. Although FIG. 2 will be described in which the storage engines 118 have compute nodes 116 with two types of caches $124_1$, $124_2$ formed using different cache technologies, in some embodiments more than two types of cache technologies may be used to implement cache 124. In FIG. 2, cache $124_1$ is formed using a higher performance cache technology and cache $124_2$ is formed using a lower performance cache technology. In operation, cache slots $220_1$, $220_2$ are allocated from the respective caches $124_1$, $124_2$ to enable the storage system 100 to process write and read IO operations.

Figure 3:
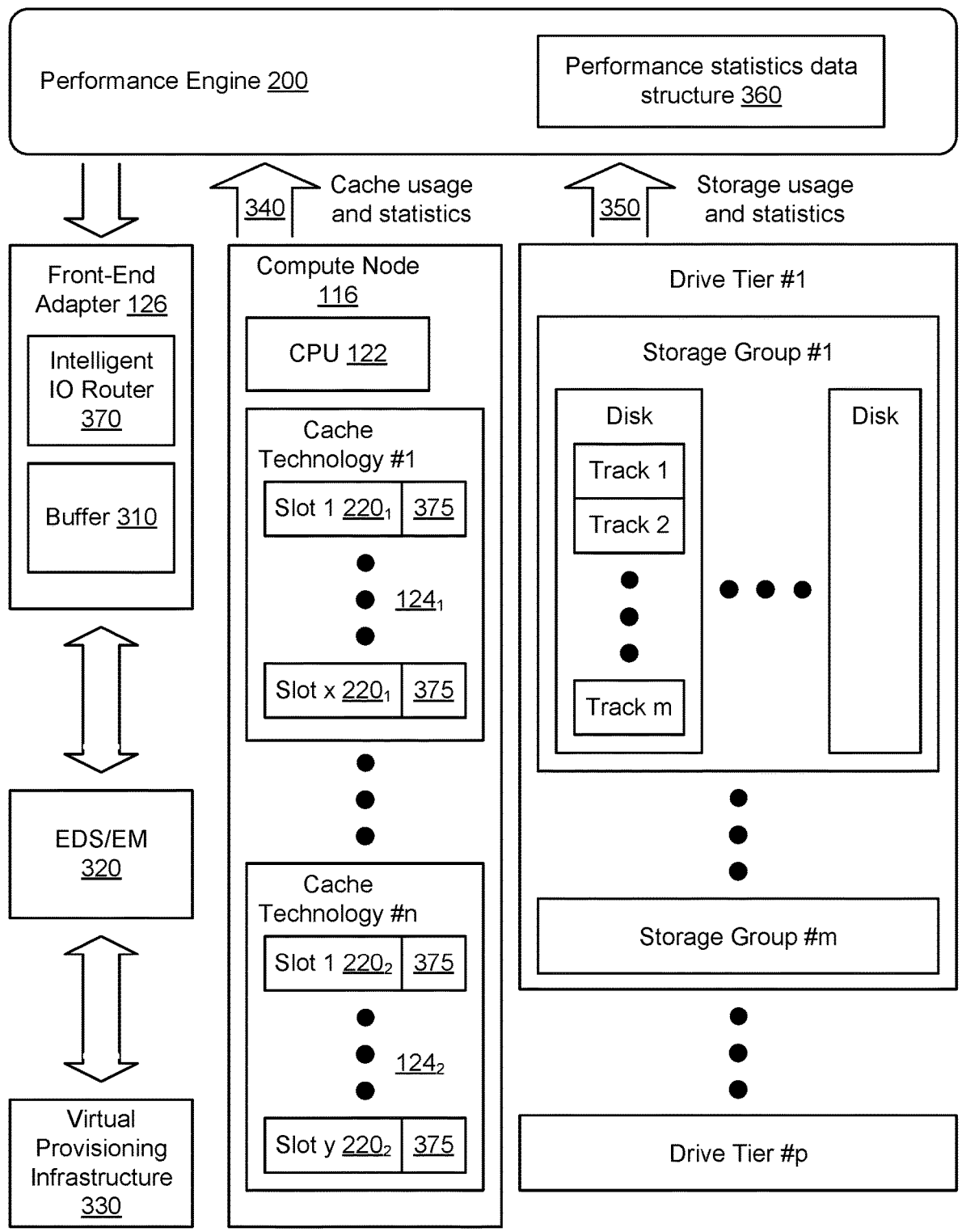
FIG. 3 is a functional block diagram of a performance engine and front-end adapter configured to perform cache slot allocation based on data origination location or final data destination location, according to some embodiments.

FIG. 3 is a functional block diagram showing some aspects of the cache management system of FIG. 2 in greater detail. In some embodiments, when a write operation is received on a front-end adapter 126, the front-end adapter 126 temporarily stores the write operation in a buffer 310. For a new disk/track allocation, the front-end adapter 126 will send a request to an EDS/EM 320 (data services subsystem) director 320. The EDS/EM 320 will interface with the VP (Virtual Provisioning) infrastructure 330 and request the VP infrastructure 330 to find free space for the write operation in managed devices 132. The VP infrastructure 330 will allocate a frontend device/track (tdev/track) to a backend device/track (tdat/track). Once the linkages have been setup the EDS/EM 320 will send a message back to the frontend adapter 126 to inform the front-end adapter 126 that the allocation has been performed by the VP infrastructure 330. Where the write operation is replacing data current stored in the storage system, the front-end adapter determines the location (disk/track) where the write will occur from metadata associated with the data.

In both instances, a cache slot 220 is then selected for the write operation by the front-end adapter 126 and the data associated with the write operation is moved from the buffer 310 to the selected cache slot 220. If compression is not enabled, the data will then be written out of the selected cache slot through a back-end adapter 128 to the selected set of managed devices 132. If compression is enabled, the data will be written out through a compression engine prior to being written to the selected set of managed devices 132.

Once the incoming write is accepted into cache, the data that is stored in the cache slot will be held in the selected cache slot 220 until it is moved to another cache slot 220 or destaged to one or more managed drives 132. This state of a cache slot will be referred to herein as "write pending". Data will occupy the selected cache slot 220 during the write pending period of time, and the length of time that a given cache slot 220 will be in the write pending state will vary depending on the write speed of the storage media where the data will ultimately be stored (e.g. speed of drive 132) and other system factors. Once the data has been moved to another cache slot 220 or destaged to disc 132, the data that was contained in the cache slot 220 has been safely moved so that the cache slot 220 is free to be reused for a different IO.

Only cache slots 220 that do not currently contain write data that is still write pending can be used to service new slot allocations. Accordingly, when the cache 124 has a higher percentage of cache slots 220 that are in the write pending state, it is harder for the storage system 100 to perform new slot allocations, as there are fewer available cache slots 220 to choose from.

As shown in FIG. 3, in some embodiments the performance engine 200 collects cache usage and statistics information 340 from the compute nodes 116, and collects storage usage and statistics information 350 from back-end drive arrays 130, and uses this information to populate a performance statistics data structure 360. The performance engine 200 makes recommendations to the front-end adapter 126 to enable the front-end adapter 126 to intelligently allocate cache slots 220 from available cache technologies based on an expected amount of time the data will remain in the cache slot as write pending. In some embodiments, as shown in FIG. 3, an intelligent IO router 370 is implemented in the front-end adapter 126 to make cache slot 220 allocation decisions based on expected throughput of the write IO. Although the description will focus primarily on allocation of cache slots 220 in connection with processing of a write IO operation, cache slots 220 can also be allocated using the same types of considerations in connection with a read IO operation, for example as discussed in greater detail below in connection with FIG. 6, when the requested data is not previously stored in cache 124.

In some embodiments, when a cache slot 220 is allocated to be used in a write operation, a write pending flag 375 associated with the cache slot is used to mark the cache slot 220 as WP (Write Pending). The write pending indication (referred to herein as a write pending flag) indicates that the cache slot contains write data that must be saved to disk. The write pending flag 375 is cleared when the data has been moved to another cache slot or has been saved to disk. Although FIG. 3 shows the write pending flags 375 associated with the cache slots, in some embodiments the write pending flags 375 are included in the cache metadata.

In some embodiments, the cache usage and statistics data 340 includes information concerning write throughput to specific production devices 140, LUNS, physical disks 132, drive tiers, and service levels, by recording the time intervals between when the write pending flag 375 is set for each cache slot, and when the write pending flag 375 gets cleared for the respective cache slot. This data is recorded for front-end virtually provisioned devices as well as for back-end devices, such as individual physical disks 132 and tracks on the individual discs 132 on the backend. In some embodiments, the track linkage information is used to identify which physical disks are being used to provide storage for specific tracks of virtually provisioned devices. This real time measurement data is used by the intelligent IO router 370, in some embodiments, to predict the amount of time it is likely to take for a particular write operation to occur when the write operation first arrives at the storage system 100. Based on the destaging time prediction, a slot in one of the caches $124_1$, $124_2$, is selected to optimize availability, and hence throughput, of the higher performance cache $124_1$.

In some embodiments, the intelligent IO router 370 uses information from the performance statistics data structure 360 to predict how long a specific track or IO of write data is predicted to stay in cache before being destaged to disk. Based on this determination, the intelligent IO router 370 decides which type of cache technology should be used and where to store this write data in cache before it is saved in cache. This enables cache usage to be optimized and enables a larger amount of workload to be processed using cache slots 220 of the higher performing cache technology. Optionally, in an environment where there are multiple compute nodes 116, a cache slot 220 in the selected cache technology is preferably selected on a compute node 116 that is physically close to the intended back end drive.

For instance, a particular piece of write data is written into a cache slot $220_1$ of a cache $124_1$ implemented using a high-performance cache technology such as DRAM, it would be advantageous if that piece of write data can be saved to disk 132 as quickly as possible so that the cache slot $220_1$ in the high-performance cache $124_1$ can be reused for another IO concerning separate customer/user address space quickly. That way this valuable DRAM cache memory space can perform more work over a given interval of time. If it is predicted that there is a probability that the piece of write data is likely to reside in cache 124 for a longer period, then it might be more economical for a cache slot $220_2$ to be allocated from a cache $124_2$ implemented using a lower-performing cache technology, such as on-board SCM cache memory space.

Likewise, if particular write operation has been allocated a slot $220_1$ in the higher performance cache $124_1$, and it appears that it might take longer than expected to write the data out to drive 132, in some embodiments a decision is made to move the write data from a cache slot $220_1$ in the higher-performing cache $124_1$ to a cache slot $220_2$ in the lower-performing cache $124_2$ to free up the faster DRAM cache memory space to serve faster and more critical workloads. For example, if the system knows that particular write data will be de-staged somewhat slowly, and that write data resides in the higher-performing DRAM cache, then that cache slot $220_1$ in the higher performing DRAM cache $124_1$ is unavailable for the system to reuse for other new incoming writes until this data has been saved to disk. It may be that some write data for a customer's most mission critical applications is being held up and delayed, while waiting for the slower write data to de-stage. This means that the higher priority data is being delayed while waiting for its write workload to be accepted into the higher-performing cache $124_1$. If this slower write workload took a factor of five times longer to de-stage to disk than a write to a faster address space or track, then this same piece of DRAM memory space or slot could have been used for five such faster write IOs in the time that it took for that write data to be saved to disk for this slower IO or track. In such a case, and particularly in a system where there is a high percentage of write data currently in DRAM cache, it may be beneficial for such write data that is known to destage slower, or predicted to be destage slower, to be moved from the higher performing cache $124_1$ to the lower performing cache $124_2$.

Figure 4:
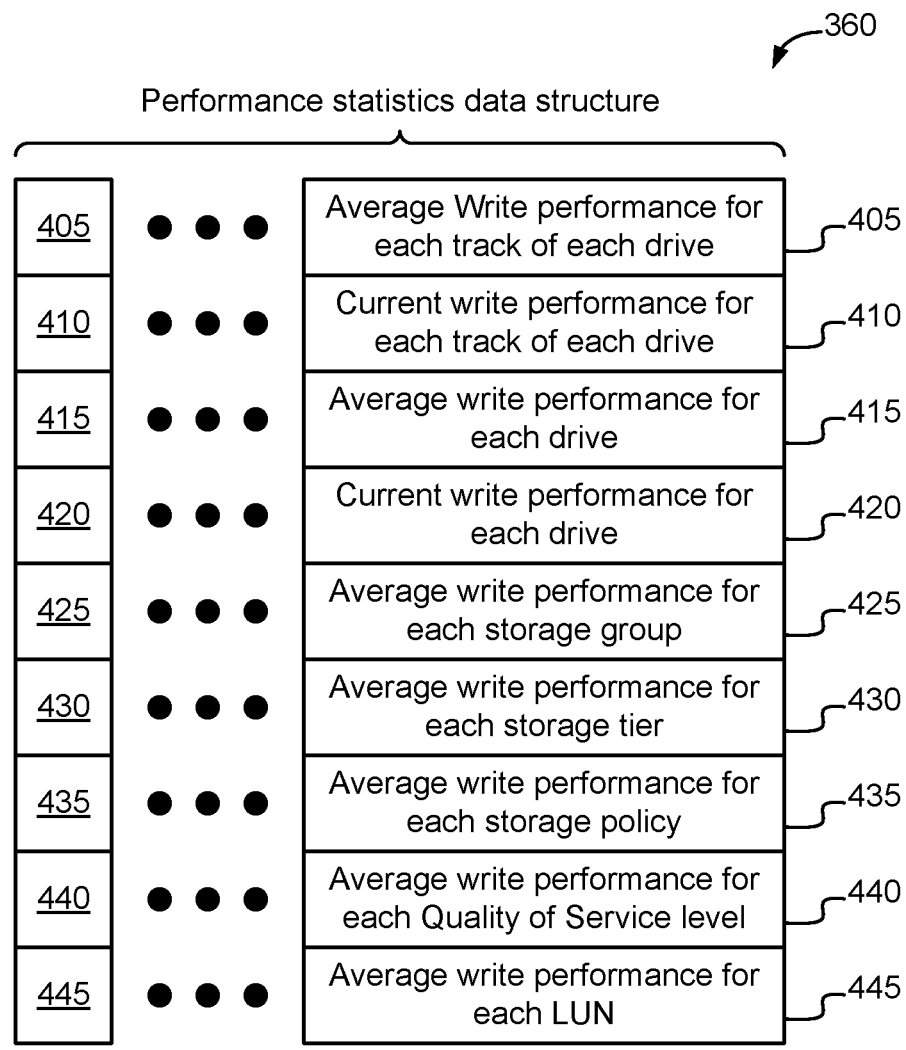
FIG. 4 is a functional block diagram of an example performance statistics data structure, according to some embodiments.

FIG. 4 is a functional block diagram of an example performance statistics data structure 360. Although an example set of fields will be described in connection with the example performance statistic data structure 360 of FIG. 4, not all of these fields may be used and the particular set of selected fields will depend on the particular implementation. The performance statistics data structure 360 can have many forms depending on the implementation.

As shown in FIG. 4, in some embodiments the performance statistics data structure 360 has a set of fields 405 used to hold average write performance information for each track of each drive 132. When a back-end track is allocated to a given write operation, the average write performance information for the track is used to determine an expected amount of time the write operation will remain write pending before being destaged to the drive 132 containing the allocated back-end track.

In some embodiments the performance statistics data structure 360 has a set of fields 410 used to hold current write performance information for each track of each drive 132. The current write performance can be used, if available, to provide a more accurate determination of an expected amount of time the write operation will remain write pending before being destaged to drive 132.

In some embodiments, for example where track specific information is not available or where that level of granularity is not needed to make an intelligent cache slot selection, the performance metrics data structure 360 includes a set of fields 415 that are used to hold average write performance for each drive 132. When a back-end track is allocated to a given write operation, the average write performance information for the drive is used to determine an expected amount of time the write operation will remain write pending before being destaged to the selected drive 132.

In some embodiments, the performance metrics data structure 360 includes a set of fields 420 that are used to hold current write performance information for each drive 132. The current write performance can be used, if available, to provide a more accurate determination of an expected amount of time the write operation will remain write pending before being destaged to drive 132 than could be obtained using only the average write performance (field 415) for each drive 132. For example, a given drive may be experiencing a long sequential read or write operation that may impact the amount of time a given new write operation will take to destage to that device.

In some embodiments, the performance statistics data structure 360 includes additional less granular metrics related to the performance of the storage system 100. For example, as shown in FIG. 4, in some embodiments the performance statistics data structure 360 includes fields that are used to hold information about the average write performance for each storage group (425), the average write performance for each storage tier (430), average write performance for each storage policy (435), average write performance for each storage QOS (Quality Of Service) level (440), and average write performance for each LUN (445). Other fields may be included as well depending on the implementation.

There are many ways for the storage system to decide what write operations should be allocated a cache slot $220_1$ in higher performing cache $124_1$, and which write operations should be allocated a cache slot $220_2$ in the lower performing cache $124_2$.

In some embodiments, the storage system evaluates the known current or expected speed at which the data is reasonably expected to be saved to a particular physical disk or group of disks depending on the protection level.

In some embodiments, the storage system evaluates the type of drive or storage media tier level where the write is going to occur. Example drive types include mirrored SCM (Storage Class Memory) drive, RAID SCM Drive, FLASH Drive of various configurations and/or quality, and magnetic HDD drives. Each type of drive would have a normal reasonable expected amount of time that it would take to save write data to disk, or write speed, under normal conditions.

Figure 5:
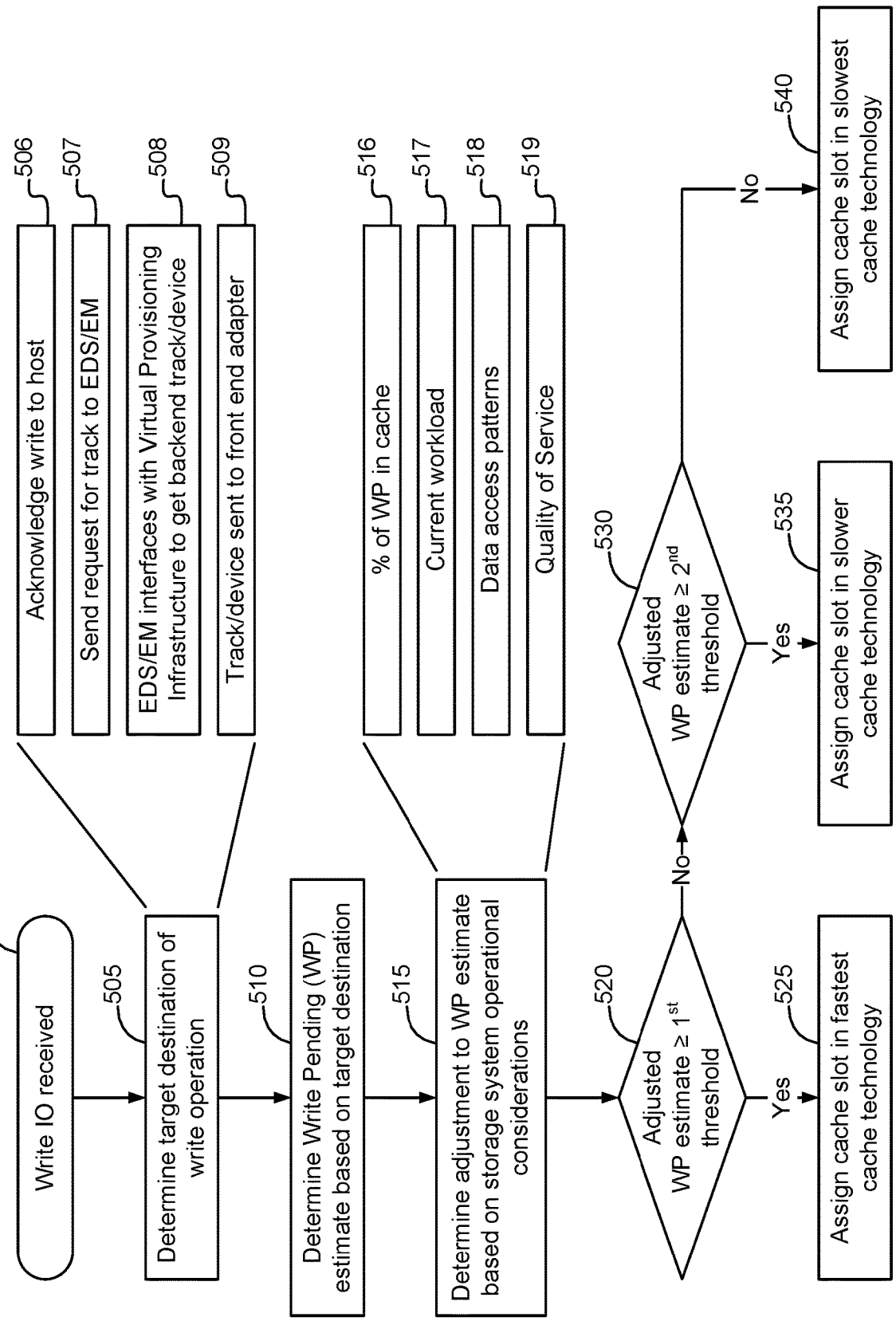
FIG. 5 is a flow chart of a process of implementing cache slot allocation for a write IO operation based on final data destination location, according to some embodiments.

FIG. 5 is a flow chart of a process of implementing cache slot allocation based on final data destination location, according to some embodiments. As shown in FIG. 5, in some embodiments when a write IO operation is received (block 500), the front-end adapter determines a target destination of the write operation (block 505). Different storage systems 100 may be configured to implement the process (block 505) differently, depending on the particular embodiment. In some embodiments, the write operation is acknowledged to the host computer 102 (block 506) and a request for a back-end track is sent to the data services subsystem EDS/EM 320 (block 507). The data services subsystem interfaces with the virtual provisioning infrastructure 330 to obtain a backend track/device allocation (block 508). The device/track of the backend allocation is then returned to the front-end adapter (block 509).

In some embodiments, the front-end adapter 126 is configured to send an acknowledgment (block 506) back to the host computer 102 before the VP linkage is set up (block 509). Under normal circumstances when the write IO arrives in buffer 310, the frontend adapter sends an acknowledgement back to the host computer 102 immediately. This is done using asynchronous allocation. So even though the backend track has not been allocated, an acknowledgement is sent back to the host computer 102. In some embodiments, if the available empty disc space for a given drive pool drops below a threshold such as 5% available capacity, or where the volume of write data currently in cache memory 124 and not yet written out to disc is close to the available empty space on the disc, the storage system will delay sending an acknowledgment (block 506) to the host computer 102 until the VP linkage is set up (block 509), so that the front-end adapter is certain that there is sufficient space in the drive pool. Accordingly, different storage systems and different operational conditions of a storage system 100 may affect the order in which blocks 506-509 are implemented.

Once the front-end adapter knows the backend track/device where the write will be stored, the intelligent IO router 370 of the front-end adapter 126 uses the statistical performance information about the device and/or backend track from the performance statistics data structure 360 to determine a write pending estimation based on the target destination (block 510). This may be estimated, for example, based on the average amount of time it takes to destage write data from a cache slot to the selected track, device, storage group, storage tier, storage policy, storage QOS level, or based on other information contained in the performance statistics data structure 360.

In some embodiments, after determining an expected amount of time it will take to destage the write data to the selected device/track, the front-end adapter determines an adjustment to the write pending estimate based on storage system operational considerations (block 515).

One example storage system operational consideration may include the percentage number of cache slots that are currently write pending (block 516). Having a large percentage of cache slots marked as write pending may mean that there is significant amount of data to be written out of the cache 124, which may indicate that the current write operation will take longer than normal. Further, by aligning cache usage with destage speed, it is possible to align IO throttling with the actual performance of the drives and the storage system itself. For example, if a throttling algorithm is implemented that performs IO throttling based on the percentage of the cache space that is write pending, such IO throttling will automatically cause the throttling to be based on the actual performance of the drives and the storage system itself.

Another storage system 100 operational consideration may be the current workload on the storage system 100 (block 517). If the storage system 100 is experiencing a higher than average workload, it may take longer to write data out of the selected cache slot 220 than would be expected under normal storage system 100 workload conditions.

Another storage system operational consideration may be associated with the data access patterns (block 518). In some embodiments, the intelligent IO router 370 evaluates patterns of data access in the users address space. A defined access pattern may mean that data access, and therefore write performance, has been optimized for specific devices and user address space, such that the expected write speed has already been optimized for that address space in the system. For example, when hot data, which is likely to be accessed frequently in the near future is detected, the fact that the data access/write performance has been optimized means that the write operation would be expected to take less time, and that the write operation should preferentially be allocated a slot from the higher performance cache.

In some embodiments, the intelligent IO router 370, in part, bases the cache slot allocation decision according to a QOS (Quality of Service) level (e.g. platinum, diamond, or gold service level) for the device, LUN, or user address space. For example, in some embodiments the intelligent IO router is configured to use the QOS level as a weighting factor when deciding to keep some write data for the device, LUN, or user address space that has not destaged in higher-performing cache, and other write data for the device, LUN, or user address space that has not destaged in the lower performing cache. In some embodiments, the QOS weighting factor is adjustable, for example by the customer, to enable the customer to distinguish and protect traffic associated with critical applications.

Another benefit over previous approaches is in respect to write workloads that come to the storage system in bursts. In some embodiments, if a write workload burst is received for a low priority, lower tier or lower service level data, that is predicted to take longer to destage from cache, then this incoming write data will be allocated space in lower performing cache memory space rather than the faster and more valuable cache space. When a write workload burst is received for higher priority, higher tier or higher service level data, that is predicted to take less time to destage to disk, then preferentially cache space in the higher performing cache is allocated for this incoming write workload burst. This would also be the case for read workloads. Accordingly, in some embodiments, weighting the cache slot allocation based on quality of service enables the storage system to better cope with burst type read and write workloads.

In some embodiments, the storage system uses the cache subsystem to gather detailed usage statistics that, in the background, locally on the board utilize infrastructure to increment and decremented counters that indicate when tracks are write pending and to measure the exact throughput of individual physical drives, raid groups and storage tiers and adapt accordingly whether to position write data in slots of the higher-performing cache or lower-performing cache.

In some embodiments, when the entire system cache comes under increased pressure as the % of cache space that contains write data versus read data increases, it becomes more difficult for the system to accept more incoming new write data. In some embodiments, during these operational conditions, existing write data in higher performing cache slots is aggressively moved out of those cache slots, and new incoming write data is allocated cache space in the lower-performing cache rather than in the higher-performing cache. This more fairly focuses the system's DRAM cache space resources and usage on maintaining the customers most mission critical applications.

Although FIG. 5 uses two blocks (510, 515) to describe calculation of a write pending estimate, in some embodiments these two blocks are combined such that information about the target destination and storage system operational conditions are considered together to determine a write pending estimate for the incoming write operation.

Based on these and possibly other factors, the expected amount of time that the write operation will be write pending in the cache slot is adjusted (block 515). The write pending estimate is then compared with a first threshold length of time (block 520). If the write pending estimate is equal to or shorter than the first threshold length of time (a determination of YES at block 520) a cache slot from the highest performing cache technology is assigned (block 525). If the write pending estimate is longer than the first threshold length of time (a determination of NO at block 520), the write pending estimate is compared with a second threshold length of time (block 530). If the write pending estimate is equal to or shorter than the second threshold length of time (a determination of YES at block 530) a cache slot from the second highest performing cache technology is assigned (block 535). If the write pending estimate is longer than the second threshold length of time (a determination of NO at block 530) a cache slot is assigned from the lowest performing cache technology (block 540).

FIG. 5 shows an implementation in which there are three cache technologies, and two time estimate thresholds are used to determine which cache technology should be used for a particular write operation. If there are only two cache technologies, a single threshold may be used (block 520) and if the write pending estimate is longer than the first threshold (a determination of NO at block 520) then a cache slot may be assigned from the slower cache technology (535). If there are more than three cache technologies, the process may be extended by using additional time estimate thresholds to select a cache slot from the various cache technologies. Although the example process shown in FIG. 5 shows use of the comparator "less than or equal to" in blocks 520, 530, other comparators such as "less than" may be used in some embodiments.

Although some embodiments have been described using write workload as an example, in some embodiments a similar cache slot allocation process can also be used for read throughput optimization. Here instead of measuring the interval of time a slot is write pending, in some embodiments the intelligent IO router 370 uses the performance statistics data structure 360 to estimate how much time it will take to obtain data from managed drives 132 and read the data out to the host computer 102. This amount of time may be based, for example, on the speed of the drive 132 where the data is currently stored, the speed of the front-end adapter 126, and operational parameters of the host computer 102. Accordingly, in some embodiments the same types of disk speed and statistics discussed above in connection with FIG. 4 apply to read operations, and accordingly can be used to estimate, in advance, how much time the storage system is expected to take to fulfill a particular read operation. Using similar criteria, if the system predicts that the read process will be slow, then in some embodiments a cache slot is allocated for the read operation from a lower-performing cache. By contrast, if the system predicts that the read process will be relatively fast, for example because it may concern high priority, a high storage tier, a high service Level, or hot data, then in some embodiments a cache slot is allocated for the read operation from a higher-performing cache.

Figure 6:
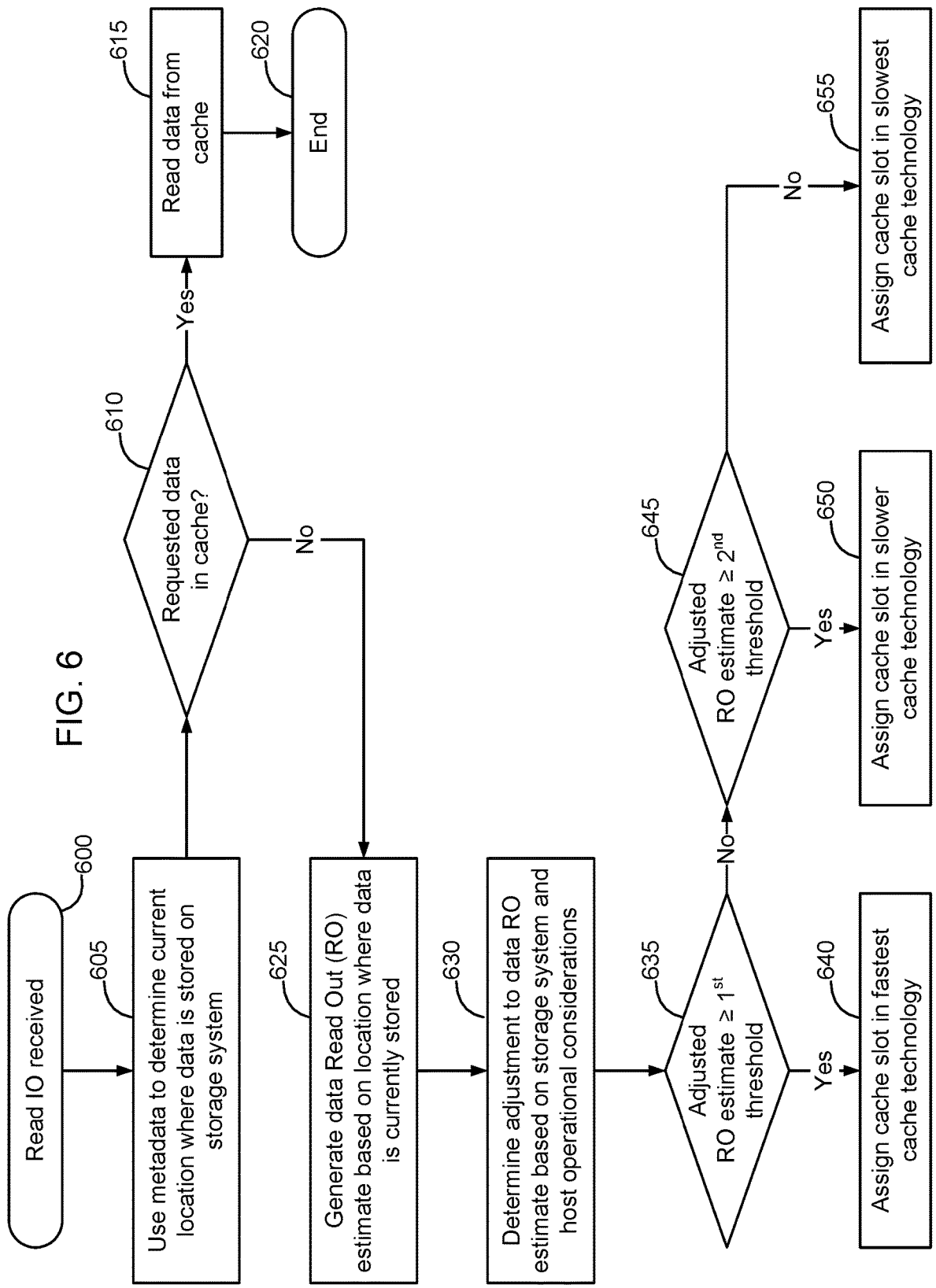
FIG. 6 is a flow chart of a process of implementing cache slot allocation for a read IO operation based on data origination location, according to some embodiments.

FIG. 6 is a flow chart of a process of implementing cache slot allocation based on data origination location, according to some embodiments. As shown in FIG. 6, when a read operation is received (block 600) the front-end adapter 126 will obtain metadata for the requested data to determine where the requested data is stored in global memory 138 or managed drives 132 (block 605). If the requested data is stored in global memory 138, it already exists in a cache slot 220 and a new cache slot allocation is not required. Accordingly, at block 610 a determination is made as to whether the requested data is in the cache. If the requested data is in the cache (a determination of YES at block 610) the data is read from the cache (block 615) and the process ends (block 620).

If the requested data is not in cache (a determination of NO at block 610), a cache slot 220 allocation will need to be made for the read IO operation. Accordingly, in some embodiments the front-end adapter 126 passes the location of the requested data to the intelligent IO router 370. The intelligent IO router 370 uses information from the performance statistics data structure 360 about the location where the data is currently stored to generate a data retrieval estimate (block 625). Example information used by the intelligent IO router 370 to generate the data retrieval estimate may include the read speed of the current track, device, storage group, storage tier, storage policy, or storage QOS level, or based on other information contained in the performance statistics data structure 360.

After generating the data retrieval estimate, the intelligent IO router 370 determines an estimate of the total amount of time (Read-Out interval) it will take to read the data out to the host computer 102 (block 630). The Read-Out estimate may be based in part on an adjustment to the data retrieval estimate based on storage system operational considerations. Example operational considerations may include the current workload on the storage system 100, fabric 136, back-end adapter 128, CPU 122, front-end adapter 126 and other information related to average or current storage system throughput, bandwidth, and response time. Likewise, in some embodiments, the read-out interval is determined, in part, based on the average or current communication parameters associated with interconnection between the host computer 102 and the storage system 100.

Although FIG. 6 uses two blocks (625, 630) to describe calculation of a read-out estimate, in some embodiments these two blocks are combined such that information about the target destination and storage system operational conditions are considered together to determine a write pending estimate for the incoming write operation.

Once the estimated RO (Read-Out interval) has been determined, the estimated read-out estimate is compared with a first threshold length of time (block 635). If the read-out estimate is equal to or shorter than the first threshold length of time (a determination of YES at block 635) a cache slot from the highest performing cache technology is assigned (block 640). If the read-out estimate is longer than the first threshold length of time (a determination of NO at block 635), the read-out estimate is compared with a second threshold length of time (block 645). If the read-out estimate is equal to or shorter than the second threshold length of time (a determination of YES at block 645) a cache slot from the second highest performing cache technology is assigned (block 650). If the read-out estimate is longer than the second threshold length of time (a determination of NO at block 645) a cache slot is assigned from the lowest performing cache technology (block 655). Although FIG. 6 has been described in connection with two thresholds that are used to allocate cache slots 220 for read IO operations from three discrete cache technologies, other numbers of thresholds and cache technologies may be used depending on the implementation. Although the example process shown in FIG. 6 shows use of the comparator "less than or equal to" in blocks 635, 645, other comparators such as "less than" may be used in some embodiments.

The methods described herein may be implemented as software configured to be executed in control logic such as contained in a Central Processing Unit (CPU) or Graphics Processing Unit (GPU) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible non-transitory computer readable medium such as random-access memory, a computer memory, a disk, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A non-transitory tangible computer readable storage medium having stored thereon a computer program for performing cache slot allocation based on final data destination location, the computer program including a set of instructions which, when executed by a computer, cause the computer to perform a method comprising the steps of:
 receiving a write IO(Input/Output) operation by a storage system, the write IO operation containing data to be written to permanent storage, the storage system having a high performing cache, a lower performing cache, and the permanent storage;
 determining a storage location in the permanent storage where the data associated with the write IO operation will be stored once the data is destaged from either the high performing cache or the lower performing cache to the determined storage location in the permanent storage; and
 after determining the storage location in the permanent storage where the data associated with the write IO operation will be stored, selecting a cache slot for the write IO operation from either the high performing cache or the lower performing cache, the step of selecting being based on a predicted amount of time to stay in cache before destaging the data associated with the write IO operation, from the selected cache slot to the determined storage location in the permanent storage, after the data associated with the write IO operation is stored in the selected cache slot;
 storing the data associated with the write IO operation in the selected cache slot; and
 destaging the data associated with the write IO operation from the selected cache slot to the determined storage location in the permanent storage.

2. The non-transitory tangible computer readable storage medium of claim 1, wherein the storage location in permanent storage is a drive on the storage system, and wherein determining the estimated amount of time associated with moving the data to the determined storage location in permanent storage comprises determining an average amount of time it takes to write data to the drive based on an average write performance of the drive.

3. The non-transitory tangible computer readable storage medium of claim 1, wherein the storage location in permanent storage is a track on a drive on the storage system, and wherein determining the estimated amount of time associated with moving the data to the determined storage location in permanent storage comprises determining an average amount of time it takes to write data to the drive based on an average write performance of the track of the drive.

4. The non-transitory tangible computer readable storage medium of claim 1, further comprising determining an adjusted write pending estimate based on an adjustment to the estimated amount of time associated with moving the data to the determined storage location in permanent storage.

5. The non-transitory tangible computer readable storage medium of claim 4, wherein determining the adjusted write pending estimate comprises determining a current percentage of cache slots that are write pending and determining a current workload of the storage system.

6. The non-transitory tangible computer readable storage medium of claim 5, wherein the step of selecting the cache slot for the write IO operation from either the high performing cache or the lower performing cache is based in part on a determined quality of service level of the data associated with the write operation.

7. The non-transitory tangible computer readable storage medium of claim 4, further comprising comparing the adjusted write pending estimate with a first threshold; and
 wherein the step of selecting the cache slot for the write IO operation from either the high performing cache or the lower performing cache is based on the result of the step of comparing the adjusted write pending estimate with the first threshold.

8. The non-transitory tangible computer readable storage medium of claim 7, wherein a cache slot in the high performing cache is selected if the adjusted write pending estimate is lower than the first threshold, and a cache slot in the lower performing cache is selected if the adjusted write pending estimate is above the first threshold.

9. The non-transitory tangible computer readable storage medium of claim 1, further comprising determining if the write operation is a burst write operation, determining a quality of service level for the write operation, assigning the burst write operation to the lower performing cache if the burst write operation has a lower quality of service level, and assigning the burst write operation to the higher performing cache if the burst write operation has a higher quality of service level.

10. The non-transitory tangible computer readable storage medium of claim 1, wherein write operations that are expected to destage quickly are assigned to the higher performing cache technology and write operations that are expected to destage more slowly are assigned to the lower performing cache technology.

11. A method of performing cache slot allocation based on final data destination location, comprising:
 receiving a write IO (Input/Output) operation by a storage system, the write IO operation containing data to be written to permanent storage, the storage system having a high performing cache, a lower performing cache, and the permanent storage;
 determining a storage location in the permanent storage where the data associated with the write IO operation will be stored once the data is destaged from either the high performing cache or the lower performing the selected cache to the determined storage location in the permanent storage; and
 after determining the storage location in the permanent storage where the data associated with the write IO operation will be stored, selecting a cache slot for the write IO operation from either the high performing cache or the lower performing cache, the step of selecting being based on a predicted amount of time to stay in cache before destaging the data associated with the write IO operation, from the selected cache slot to the determined storage location in the permanent storage, after the data associated with the write IO operation is stored in the selected cache slot;
 storing the data associated with the write IO operation in the selected cache slot; and
 destaging the data associated with the write IO operation from the selected cache slot to the determined storage location in the permanent storage.

12. The method of claim 11, wherein the storage location in permanent storage is a drive on the storage system, and wherein determining the estimated amount of time associated with moving the data to the determined storage location in permanent storage comprises determining an average amount of time it takes to write data to the drive based on an average write performance of the drive.

13. The method of claim 11, wherein the storage location in permanent storage is a track on a drive on the storage system, and wherein determining the estimated amount of time associated with moving the data to the determined storage location in permanent storage comprises determining an average amount of time it takes to write data to the drive based on an average write performance of the track of the drive.

14. The method of claim 11, further comprising determining an adjusted write pending estimate based on an adjustment to the estimated amount of time associated with moving the data to the determined storage location in permanent storage.

15. The method of claim 14, wherein:
determining the adjusted write pending estimate comprises determining a current percentage of cache slots that are write pending and determining a current workload of the storage system.

16. The method of claim 15, wherein the step of selecting the cache slot for the write IO operation from either the high performing cache or the lower performing cache is based in part on a determined quality of service level of the data associated with the write operation.

17. The method of claim 14, further comprising:
comparing the adjusted write pending estimate with a first threshold; and
wherein the step of selecting the cache slot for the write IO operation from either the high performing cache or the lower performing cache is based on the result of the step of comparing the adjusted write pending estimate with the first threshold.

18. The method of claim 17, wherein a cache slot in the high performing cache is selected if the adjusted write pending estimate is lower than the first threshold, and a cache slot in the lower performing cache is selected if the adjusted write pending estimate is above the first threshold.

19. The method of claim 11, further comprising:
determining if the write IO operation is a burst write operation; and
when the write IO operation is a burst write operation:
determining a quality-of-service level for the burst write operation;
assigning the burst write operation to the lower performing cache if the burst write operation has a lower quality of service level; and
assigning the burst write operation to the higher performing cache if the burst write operation has a higher quality of service level.

20. The method of claim 11, wherein write operations that are expected to destage quickly are assigned to the higher performing cache technology and write operations that are expected to destage more slowly are assigned to the lower performing cache technology.

* * * * *